Feb. 24, 1959
J. R. HARCLERODE
2,874,687
MOVEMENT LIMITING GUARD FOR THE SAW ON THE
CUTTING HEAD OF MASONRY SAWS
Filed Feb. 11, 1957
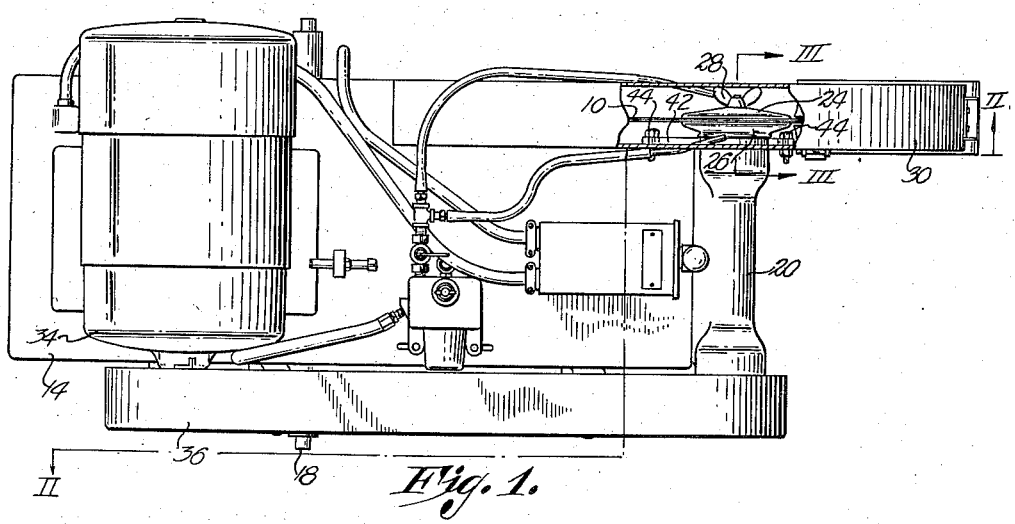
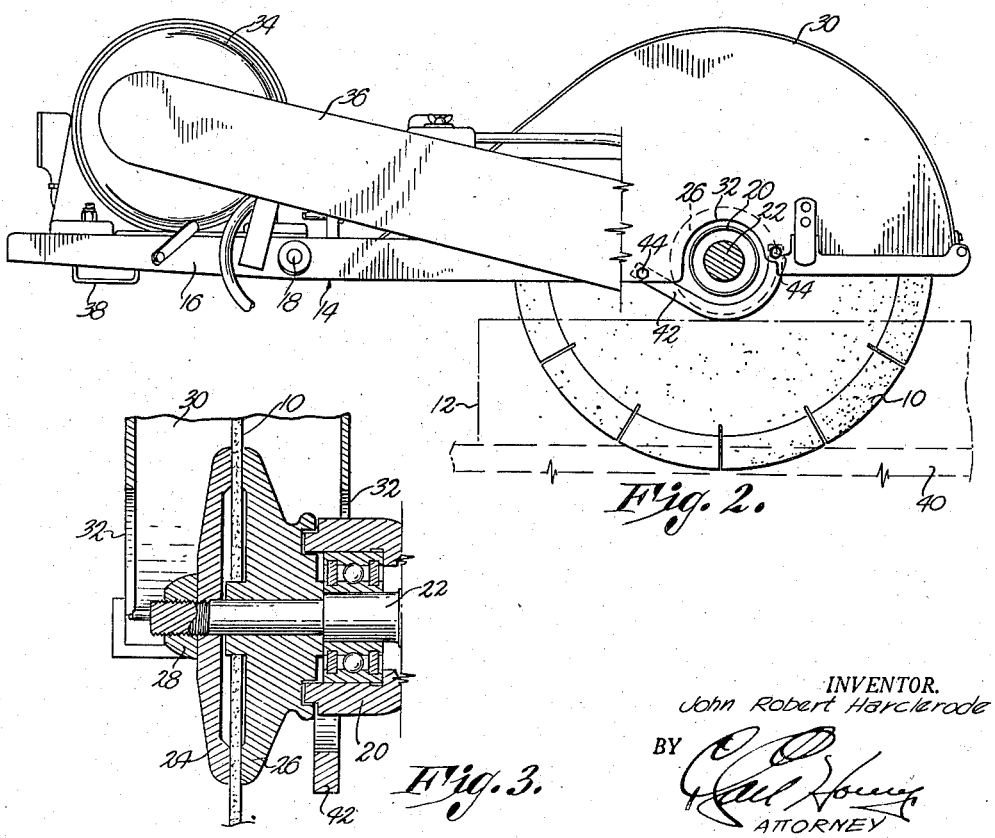
INVENTOR.
John Robert Harclerode
BY
ATTORNEY United States Patent Office 2,874,687
Patented Feb. 24, 1959

2,874,687

MOVEMENT LIMITING GUARD FOR THE SAW ON THE CUTTING HEAD OF MASONRY SAWS

John Robert Harclerode, Kansas City, Mo., assignor to Clipper Manufacturing Company, Kansas City, Mo., a corporation of Missouri Application February 11, 1957, Serial No. 639,558

3 Claims. (Cl. 125—13)

This invention relates to improvements in masonry saws such as disclosed for example, in Patent No. 2,171,024, issued to N. C. Coats on August 29, 1939, the primary object being to provide a novel guard for the collar means that is employed to mount the circular cutter on its mandrel whereby to protect such collars, as well as other adjacent parts against damage as the cutter moves into a workpiece.

As disclosed in the aforementioned patent, masonry saws and the like to which the instant invention relates, operate on the principle of swinging the circular saw into engagement with the workpiece as the latter is supported by a horizontally reciprocable work-supporting cart. Swinging movement is under the control of the operator, and more specifically, a foot lever, the object being to progressively lower the saw into the workpiece as the kerf is cut thereinto. It is difficult and time-consuming to carefully avoid contact of the mounting collars with the workpiece, inasmuch as the latter is usually formed from relatively hard, abrasive, cementitious materials and the like, rapid rotation of the collars thereagainst causing considerable damage.

It is the most important object of the present invention therefore, to provide a protection for such mounting collars in the nature of a guard for limiting the extent of movement of the cutting head toward the work, the guard being disposed to engage such workpiece and prevent rotative contact of the collars therewith.

Another important object of the instant invention is to provide a guard for the purposes aforesaid which is extremely simple and inexpensive and easily mounted on the support for the saw mandrel beneath the latter in partial surrounding relationship thereto, the protection being afforded by virtue of the distance between the axis of rotation of the mandrel and the outer edge of the guard as compared with the over-all diameters of the mounting collars.

In the drawing:

Figure 1 is a plan view of a cutter-head or cutting assembly forming a part of a masonry saw and incorporating therein a guard for limiting movement of the saw made pursuant to the present invention.

Fig. 2 is a side elevational view of the assembly shown in Fig. 1 partially in section as indicated by line II—II of Fig. 1; and Fig. 3 is an enlarged, fragmentary, cross-sectional view taken on line III—III of Fig. 1.

The disclosure of the above-identified patent is incorporated herein by reference for a full understanding of the nature and operation of a masonry saw of the kind contemplated by the instant invention. As therein disclosed, cutter disc 10, in the nature of a circular saw blade particularly adapted to handle bricks, concrete blocks and other workpieces such as designated by the numeral 12 in the drawing, is carried by a support 14. Support 14 is in the nature of an elongated platform having a down-turned peripheral flange 16 traversed by a shaft 18 which serves to mount the platform 14 for swinging movement about a horizontal axis.

A tubular housing 20 secured rigidly to one end of the platform 14 as by welding, encloses bearings (not shown) for a mandrel 22 that is rotatable within the tube 20 about an axis substantially parallel with the axis of shaft 18.

The cutter blade 10 is mounted on the mandrel 22 by a pair of opposed collars 24 and 26 releasably held in place by a wing nut or the like 28.

One forwardmost corner of the platform 14 is cut away as is apparent in Fig. 1, to receive a substantially semi-circular hood 30 which terminates at its lowermost edges below the upper surface of platform 14, hood 30 being welded in place throughout its zone of engagement with the platform 14. It is noted that hood 30 partially houses the cutter blade 10 thereabove and is provided with notches 32 for clearing the tube 20.

Platform 14 carries a prime mover such as electric motor 34 for driving the mandrel 22 through belt and pulley means (not shown) covered by an elongated shell 36. Means (not shown) such as disclosed in said patent or otherwise, and coupled with bracket 38 depending from platform 14 below prime mover 34, serves to permit the operator to swing the platform 14 about the shaft 18 to move the cutter 10 toward and away from work-supporting table 40. The control of the swinging movement of platform 14 normally includes a foot lever as shown in said patent.

As above indicated, care would normally be required to prevent excessive downward movement of the blade 10 into the workpiece 12 to a point where the peripheries of the collars 24 and 26 rotate against the workpiece 12 and thereby become damaged. In fact, it is not uncommon for the collars 24 and 26 to become excessively damaged by the hard, rough surfaces of workpieces 12 within a short period of use of the masonry saw and, therefore, in accordance with the principles of the instant invention, there is provided a guard 42 disposed to protect the collars 24 and 26 by limiting the extent of downward swinging movement of the mandrel 22 and, therefore, the disc 10 as shown in Fig. 2.

The guard 42 should be disposed adjacent the disc 10 and particularly the collars 24—26 and is, therefore, mounted on the support 14 in some suitable manner. More specifically, fasteners 44 at the two ends of the arcuate guard 42, serve to releasably attach the latter directly to the hood 30, the latter of which, of course, constitutes a unitary part of the platform 14.

Guard 42 depends from the hood 30 in partial surrounding relationship to the mandrel 22 adjacent the proximal end of the tube 20 and guard 42 may, throughout at least a part of its length, be concentric with the axis of rotation of mandrel 22.

More particularly however, the lowermost edge of the guard 42 must extend farther from the axis of rotation of mandrel 22 than the collars 24 and 26 in order to protect the latter by coming into contact with the other upper surface of workpiece 12 as seen in Fig. 2. Consequently, the distance between the periphery of disc 10 and the lower surface of guard 42, is less than the distance between the periphery of disc 10 and the peripheries of collars 24 and 26.

It is noted that the guard 42 is formed and disposed in a manner to not interfere in any manner with free rotation of the mandrel 22, disc 10 and the mounting parts 24, 26 and 28. Furthermore, guard 42 does not in any manner interfere with removal and replacement of disc 10 as desired, and the entire cutting assembly may be placed in use in a normal manner so far as severing workpieces 12 is concerned without guard 42 in any way adversely affecting the intended use of the machine.

Having thus described the invention what is claimed as new and desired to be secured by Letters Patent is:

1. In combination with a platform mounted for swinging movement vertically toward and away from a workpiece to be cut; a mandrel rotatably secured to the platform; a circular saw mounted on the mandrel, the mounting including a pair of opposed collars; a semicircular hood secured to the platform above the saw and partially housing the latter; and an arcuate collar guard attached to the hood, adjacent the saw, and beneath the mandrel in partial surrounding relationship to the latter, the distance between the periphery of the saw and the guard being only slightly less than the distance between said periphery and the peripheries of the collars.

2. In combination with a mandrel having a support and a circular cutter mounted thereon, the mounting including at least one collar, a work-engaging collar guard carried by said support and partially surrounding the mandrel between the latter and the work adjacent and alongside the cutter, said guard extending in one direction only, farther radially from the axis of the mandrel than said collar and terminating adjacent the mandrel remote from the periphery of the cutter.

3. In combination with a mandrel having a vertically swingable support and a circular cutter mounted thereon, the mounting including at least one collar, a work-engaging collar guard carried by said support for swinging movement therewith and partially surrounding the mandrel adjacent the cutter, said guard being looped beneath the mandrel between the latter and a workpiece to be cut by said cutter and extending in one direction only, farther radially from the axis of the mandrel than said collar and terminating adjacent the mandrel remote from the periphery of the cutter.

References Cited in the file of this patent
UNITED STATES PATENTS

| | | |
|---|---|---|
| 1,123,562 | Lund | Jan. 5, 1915 |
| 1,979,140 | Casey | Oct. 30, 1934 |
| 2,292,595 | Andrianoff | Aug. 11, 1942 |
| 2,377,437 | Martin | June 5, 1945 |
| 2,388,434 | Phillis | Nov. 6, 1945 |
| 2,441,535 | Sanders | May 11, 1948 |
| 2,521,777 | Collis | Sept. 12, 1950 |
| 2,716,402 | Harrison et al. | Aug. 30, 1955 |